United States Patent
Hall et al.

(10) Patent No.: US 8,494,704 B2
(45) Date of Patent: *Jul. 23, 2013

(54) TIRE PRESSURE CLASSIFICATION BASED TIRE PRESSURE MONITORING

(75) Inventors: Peter Hall, Linköping (SE); Tony Gustavsson, Askim (SE)

(73) Assignee: Nira Dynamics AB, Linkoping (SE)

( * ) Notice: Subject to any disclaimer, the term of this patent is extended or adjusted under 35 U.S.C. 154(b) by 678 days.

This patent is subject to a terminal disclaimer.

(21) Appl. No.: 12/531,682

(22) PCT Filed: Mar. 16, 2007

(86) PCT No.: PCT/EP2007/002366
§ 371 (c)(1),
(2), (4) Date: Mar. 29, 2010

(87) PCT Pub. No.: WO2008/113378
PCT Pub. Date: Sep. 25, 2008

(65) Prior Publication Data
US 2010/0204869 A1    Aug. 12, 2010

(51) Int. Cl.
*G01M 17/00*    (2006.01)
(52) U.S. Cl.
USPC .......... 701/29; 701/1; 701/37; 702/50; 705/1; 705/80; 73/146; 340/442; 340/443; 340/444; 301/5.21; 235/375; 524/494
(58) Field of Classification Search
USPC ..... 701/1, 29, 37; 702/50; 705/1, 80; 73/146; 340/442, 443, 444; 301/5.21; 235/375; 524/494
See application file for complete search history.

(56) References Cited

U.S. PATENT DOCUMENTS

| | | | |
|---|---|---|---|
| 4,574,267 A | 3/1986 | Jones | |
| 5,553,491 A | 9/1996 | Naito et al. | |
| 5,557,552 A | 9/1996 | Naito et al. | |
| 5,583,483 A * | 12/1996 | Baumann | 340/444 |
| 6,109,099 A | 8/2000 | Kawai et al. | |
| 6,501,373 B2 | 12/2002 | Kitano | |
| 6,877,371 B1 | 4/2005 | Walenty et al. | |

(Continued)

FOREIGN PATENT DOCUMENTS

| DE | 40 19 501 A1 | 4/1991 |
|---|---|---|
| DE | 19859225 A1 | 7/1999 |

(Continued)

OTHER PUBLICATIONS

PCT/EP2007/002366, International Search Report and Written Opinion, Date of Mailing Dec. 4, 2007, 11 pages.

*Primary Examiner* — James Trammell
*Assistant Examiner* — Sanjeev Malhotra
(74) *Attorney, Agent, or Firm* — Blakely, Sokoloff, Taylor & Zafman LLP

(57) ABSTRACT

In indirect tire pressure monitoring of tires of a vehicle, the following steps and means to carry out the same, respectively, are contemplated:—providing a tire classification database indicating at least one classified tire type;—determining a vehicle tire type for the vehicle on the basis of vehicle data in including information on at least one tire currently used with the vehicle,—determining whether the vehicle tire type can be associated to one of the at least one classified tire type; and—, in the case an association is determined, monitoring tire pressure according to the associated classified tire type.

11 Claims, 3 Drawing Sheets

U.S. PATENT DOCUMENTS

Figure 1:
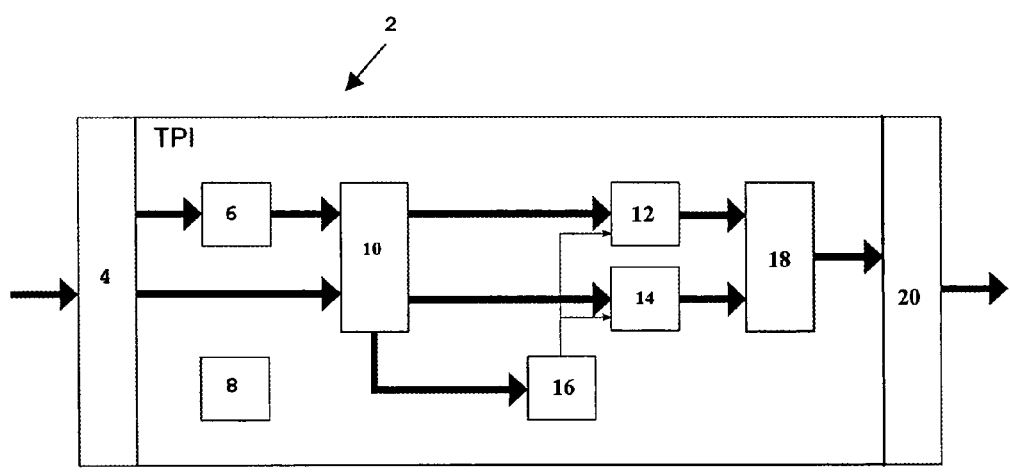

| | | |
|---|---|---|
| 2002/0024432 A1 | 2/2002 | Lin et al. |
| 2002/0157461 A1* | 10/2002 | Schmidt et al. ............... 73/146 |
| 2003/0050743 A1* | 3/2003 | Caretta et al. .................. 701/1 |
| 2003/0187555 A1* | 10/2003 | Lutz et al. ..................... 701/29 |
| 2003/0227380 A1* | 12/2003 | Piech et al. .................. 340/443 |
| 2004/0056528 A1* | 3/2004 | Naruse ........................ 301/5.21 |
| 2004/0111276 A1* | 6/2004 | Inge ................................ 705/1 |
| 2004/0164140 A1* | 8/2004 | Voeller et al. ............... 235/375 |
| 2004/0260436 A1* | 12/2004 | Kin ............................... 701/29 |
| 2005/0159534 A1* | 7/2005 | Ronlan ........................ 524/494 |
| 2005/0192727 A1* | 9/2005 | Shostak et al. ............... 701/37 |
| 2006/0001533 A1* | 1/2006 | Bessho et al. ............... 340/442 |
| 2006/0025897 A1* | 2/2006 | Shostak et al. ................ 701/1 |
| 2006/0276984 A1 | 12/2006 | Kobe et al. |
| 2007/0061100 A1 | 3/2007 | Hall et al. |
| 2007/0186634 A1* | 8/2007 | Burghardt et al. ............ 73/146 |
| 2010/0042549 A1* | 2/2010 | Adamczyk et al. ........... 705/80 |
| 2010/0191483 A1* | 7/2010 | Gustavsson et al. .......... 702/50 |
| 2010/0211250 A1* | 8/2010 | Fischer et al. ................ 701/29 |

FOREIGN PATENT DOCUMENTS

| | | |
|---|---|---|
| DE | 103 31 585 A1 | 3/2005 |
| DE | 10 2005 004910 A1 | 9/2005 |
| EP | 0 578 826 A1 | 1/1994 |
| EP | 0 783 982 A1 | 7/1997 |
| JP | 05-055322 A | 3/1993 |
| JP | 5133831 A | 5/1993 |
| JP | 2836652 B2 | 12/1998 |
| WO | WO 2005/005173 A1 | 1/2005 |
| WO | WO 2007/054585 A2 | 5/2007 |

* cited by examiner (a) Tangential force  (b) Translational force

TIRE PRESSURE CLASSIFICATION BASED TIRE PRESSURE MONITORING

CROSS-REFERENCE TO RELATED APPLICATION

This patent application is a U.S. National Phase application under 35 U.S.C. §371 of International Application No. PCT/EP2007/002366, filed on Mar. 16, 2007. entitled TIRE PRESSURE CLASSIFICATION BASED TIRE PRESSURE MONITORING.

FIELD OF THE INVENTION

The present invention relates to indirect tire pressure monitoring of tires of a vehicle on the basis of tire classification information.

BACKGROUND OF THE INVENTION

Monitoring of tire pressure can be assumed to become a standard functionality in vehicles, at least in cars and trucks, not only due to governmental and legal regulations but also in view of a general demand for enhanced vehicle safety.

The importance of having correct tire inflation pressure is well known. The inflation pressure directly affects, e.g., the vehicle handling, the load capacity, and the fuel consumption. There are studies that indicate that tire related problems are the third most common reason for breakdown of passenger vehicles. Furthermore, it has been shown that a majority of all tire flat-outs is preceded by under-inflation or slow air leakage. With tire pressure monitoring that detects the presence of air leakages, severe accidents can thus be avoided.

Besides these well known facts about the importance of having a correct inflation pressure, tire pressure monitoring has become even more important since legal regulations in some countries require all new motor vehicles to be equipped with a system that monitors the tire pressure.

There are two alternative approaches to monitor the tire pressure. One way is to mount a pressure sensor inside the tire and transfer the pressure sensor value wireless to an on-board tire pressure system of the vehicle. This approach is referred to as "direct tire pressure monitoring". The other alternative, called "indirect tire pressure monitoring", uses existing sensors (e.g. control and/or detection devices of vehicles, ECUs (electronic control unit), antilock braking systems, dynamic stability systems, anti-spin systems and traction control systems, in form of digital and/or analog data and/or signals) to compute quantities related to the tire pressure. Indirect tire pressure monitoring is not directly measuring the air/gas pressure in a tire. Rather, parameters correlated with tire pressure are calculated using data available from the vehicle (e.g. from brake system or the electronic stability control system) and, on the basis of such parameters, tire pressure is indicated.

Vehicle data commonly used in tire pressure monitoring is data indicating an effective roll radius of wheel/tire. For the sake of illustration, it will be referred to such wheel radius data in the following.

However, there are several effects possibly influencing actual tire pressure and, thus, relation(s) between actual tire pressure and data from which actual tire pressure, an estimation thereof or tire pressure deviation is to be derived.

For example, current driving situations (e.g. acceleration, deceleration; driving on smooth road surfaces vs. rough road surfaces; driving in curves etc.), temperature(s) affecting tire pressure and the like may influence actual tire pressure and should be therefore take into account in indirect tire pressure monitoring.

Further, different tire types will have different properties that may be also taken into account in indirect tire pressure monitoring. For example, different tires (brand, dimension, winter/summer, etc.) to some extent respond differently to changes in inflation pressure, e.g., for a given amount of tire pressure loss, a corresponding change in e.g. effective roll radius will differ between different tires. To ensure a reliable indirect tire pressure monitoring a consistent behavior in general, it would be helpful to specify the behavior of the pressure related parameters of tire(s).

To this end, an approach may be performing in-vehicle tests where a vehicle equipped with a tire type of interest is actually driven, wherein, e.g., pressure related tire behavior may be specified. However, such an approach will be time-consuming and expensive.

OBJECT OF THE INVENTION

The object of present invention is to improve indirect tire pressure monitoring such that tire related effects may be taken into account in a more easy and technically and economically feasible manner.

SUMMARY OF THE INVENTION

To solve the above object, the present invention provides a method, a system and a computer program product as defined in the independent claims.

According to a first aspect the present invention provides method of indirect tire pressure monitoring of tires of a vehicle, which method comprises the steps of:
  providing a tire classification database indicating at least one classified tire type;
  determining a vehicle tire type for the vehicle on the basis of vehicle data in including information on at least one tire currently used with the vehicle;
  determining whether the vehicle tire type can be associated to one of the at least one classified tire type; and
  in the case an association is determined, monitoring tire pressure according to the associated classified tire type.

According to another aspect, the present invention provides a system for indirect tire pressure monitoring of tires of a vehicle, comprising:
  a tire classification database indicating at least one classified tire type;
  a vehicle tire type determination unit being adapted to determine a vehicle tire type for the vehicle on the basis of vehicle data in including information on at least one tire currently used with the vehicle;
  an association determination unit being adapted to determine whether the vehicle tire type can be associated to one of the at least one classified tire type; and
  a tire pressure monitoring unit being adapted to, in the case an association is determined, monitor tire pressure according to the associated classified tire type.

In a still further aspect, the present invention provides computer program product, the computer program product comprising program code for carrying out, when executed on a processing system, the steps of:
  providing a tire classification database indicating at least one classified tire type;
  determining a vehicle tire type for the vehicle on the basis of vehicle data in including information on at least one tire currently used with the vehicle;

determining whether the vehicle tire type can be associated to one of the at least one classified tire type; and in the case an association is determined, monitoring tire pressure according to the associated classified tire type.

Further aspects, features and advantages of the present invention will become apparent from the below description, the accompanying drawings and the appended claims.

SHORT DESCRIPTION OF THE DRAWINGS

Figure 2:
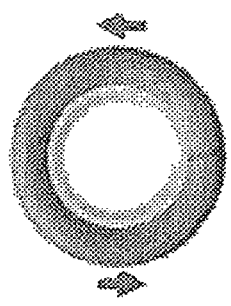
Figure 2:
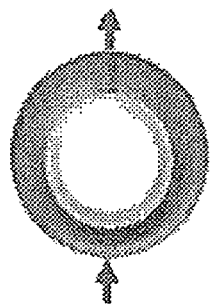
Figure 3:
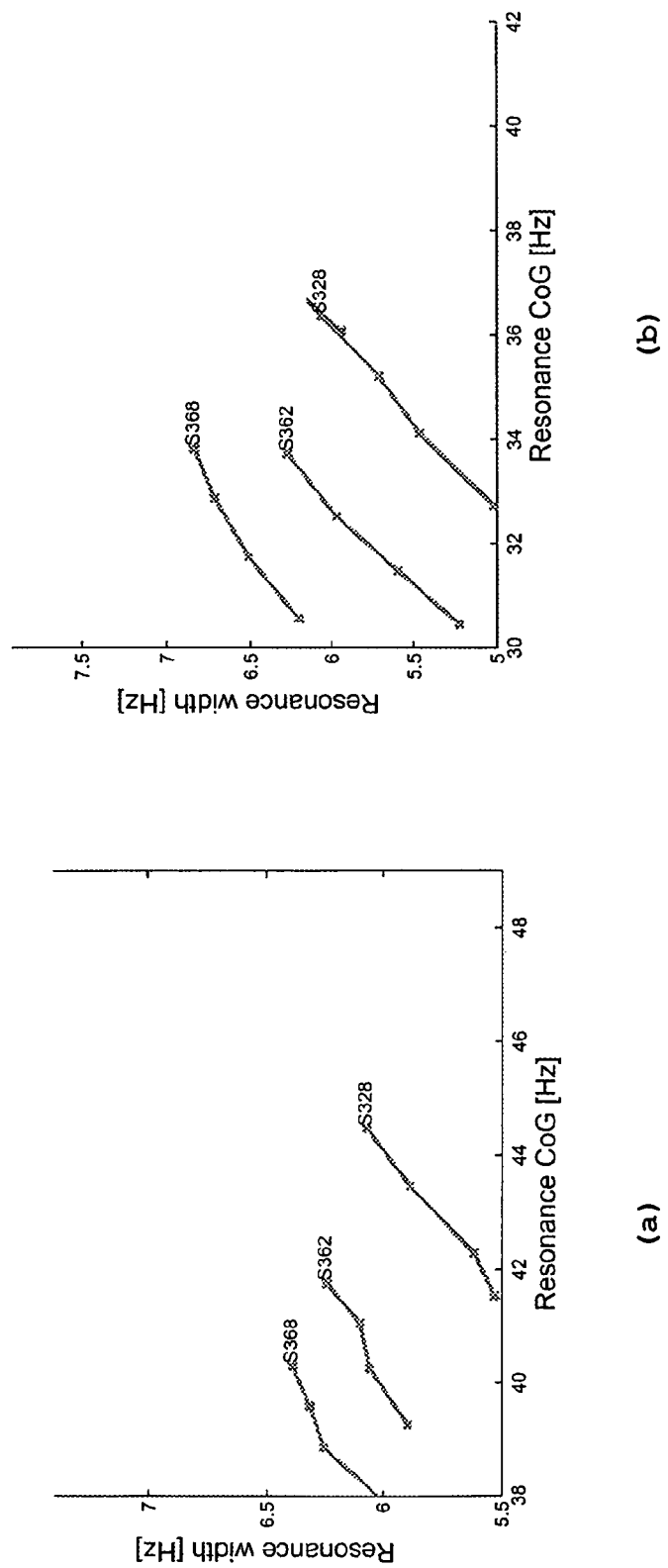

Embodiments of the invention will now be described, by way of example and with reference to the accompanying drawings, in which:

FIG. 1 schematically illustrates an indirect tire pressure monitoring system according to an embodiment of the present invention;

FIG. 2 schematically illustrates forces considered in tire classification according to the present invention; and FIG. 3 shows graphs schematically illustrating wheel speed spectrum data and tire force spectrum data.

DESCRIPTION OF PREFERRED EMBODIMENTS

FIG. 1 schematically illustrates a system according to the present invention, particularly in form of a tire pressure deviation (TPD) warning system 2 using indirect tire pressure monitoring.

The present invention is provided for use in any kind of vehicle having at least one wheel equipped with at least one tire. The term "vehicle" as used herein comprises any type of vehicle, such as cars, bikes, trucks, trailers, and the like, where information on the basis of which indirect tire pressure monitoring is possible.

A "pressure deviation" in a tire may be detected if the tire pressure actually determined for the tire differs from a normal/predefined/desired tire pressure and/or differs from the pressure of one or more other tires by a predetermined threshold value.

As used herein, "on the basis of . . . " and "based on . . . " indicate that at least the " . . . " is used as basis and should not be construed to be limited to the " . . . ", for example, "on the basis of the at least one vehicle data" indicates that at least the at least one vehicle data are used and that further, e.g., data and/or information may be used.

Further, the present invention may use vehicle data on the basis of which tire pressure monitoring is possible. Contemplated vehicle data include at least one of:

vehicle data indicative of ambient temperature;

vehicle data indicative of a temperature of an engine of the vehicle;

vehicle data indicative of an engine torque of an engine of the vehicle;

vehicle data indicative of a torque acting on the at least one tire;

vehicle data indicative of a engine speed of an engine of the vehicle;

vehicle data indicative of a yaw rate of the vehicle;

vehicle data indicative of a speed of the vehicle;

vehicle data indicative of at least one of a lateral acceleration and a longitudinal acceleration of the vehicle;

vehicle data indicative of a steering wheel angle of a steering wheel of the vehicle;

vehicle data indicative of a driving condition of the vehicle, particularly a braking condition;

vehicle data indicative that a gear shift of the vehicle is in progress;

vehicle data indicative that a braking system of the vehicle is operating;

vehicle data indicative of brake pressure; and vehicle data indicative that at least one active control device of the vehicle is active.

However, before continuing with descriptions of the drawings, some further observations to further aspects of the present invention are given. More detailed observation to the method related aspects of the present invention also apply to corresponding system related aspects and computer program related aspects of the present invention even if not explicitly noted.

In the method of the present invention, the tire classification database may indicate, in association to each of the at least one classified tire type, at least one of at least one parameter setting for tire pressure monitoring and at least one operation mode for tire pressure monitoring; wherein the method of the present invention may further comprise a step of retrieving at least one of the at least one parameter setting and at least one operation mode from the tire classification database, wherein the step of tire pressure monitoring is performed according to the retrieved at least one parameter setting and operation mode.

For example, if a tire has been classified (e.g. by precise parameters or at least a rough assignment to a respective group/type of tires), classification information may be used for, e.g., controlling/selecting a size of calibration slots in roll radius based indirect tire pressure monitoring (e.g. using wheel/tire radius analysis) and/or wheel/tire spectrum analysis, how much data should be used in each slot, adaptation speeds in roll radius based indirect tire pressure monitoring (e.g. using wheel/tire radius analysis) and/or wheel/tire spectrum analysis, indicators, warning thresholds, timers, sensitivity levels etc.

In the method of the present invention the step of determining the vehicle tire type may include a step of determining an overall vehicle tire type for the vehicle.

An overall vehicle tire type may indicate a tire type common to all vehicle tires or may be a "virtual" tire type (e.g. based on computations of information on vehicle tires of the same type) having properties, characteristics and, particularly, pressure related behavior at least partially suitable and/or acceptable for all vehicle tires irrespective of their actual types.

In such embodiments, the step of tire pressure monitoring may be performed for at least two different tires of the vehicle according to the associated classified tire type. For example, a single associated classified tire type may be used as basis for tire pressure monitoring for all vehicle tires.

In the method of the present invention, the step of determining the vehicle tire type may be performed to determine an individual vehicle tire type for at least two different tires of the vehicle.

An individual vehicle tire type may be the actual tire type of a tire being of interest (e.g. to be tire pressure monitored).

In such embodiments, the step of determining whether the vehicle tire type can be associated to one of the at least one classified tire type may be performed with respect to each of the at least two different tires.

Further, the step of tire pressure monitoring may be performed for each of the at least two different tires according to the respectively associated classified tire type. For example, for each vehicle tire type, an associated classified tire type may be used as basis for tire pressure monitoring for all vehicle tires, i.e. more than one associated classified tire types may be used.

In the method of the present invention, the step of determining the vehicle tire type may include a step of determining at least one characteristic of a tire of the vehicle; and the step of determining whether the vehicle tire type can be associated to one of the at least one classified tire type may include a step of determining whether one of the at least one classified tire type have at least one characteristic being at least comparable with the determined at least one vehicle tire characteristic.

In the method of the present invention, the step of determining the vehicle tire type may include a step of wheel speed spectrum analysis to obtain a wheel speed spectrum data for the at least one tire.

In such embodiments, the step of determining whether the vehicle tire type can be associated to one of the at least one classified tire type may include a step of determining whether the tire classification database includes data indicating a tire type having tire force spectrum data being at least comparable with the wheel speed spectrum data.

In the method of the present invention, the step of wheel spectrum analysis may include a step of determining wheel speed resonance center of gravity data for the at least one tire.

In such embodiments, the step of determining whether the vehicle tire type can be associated to one of the at least one classified tire type may include a step of determining whether the tire classification database includes data indicating a tire type having a tire force resonance center of gravity data being at least comparable with the wheel speed resonance center of gravity data.

In the method of the present invention, the step of wheel spectrum analysis may include a step of determining wheel speed resonance width data for the at least one tire.

Here, step of determining whether the vehicle tire type can be associated to one of the at least one classified tire type may include a step of determining whether the tire classification database includes data indicating a tire type having a tire force resonance width data being at least comparable with the wheel speed resonance width data.

The method of the present invention may further include a step of generating the tire classification database on the basis of testing at least one to be classified tire in a test environment.

In such embodiments, the step of generating the tire classification database may include a step of determining, for the at least one to be classified tire, data indicating characteristic tire oscillations.

According to the method of the present invention, the step of generating the tire classification database may include a step of determining, for the at least one to be classified tire, data indicating tire oscillations in tangential tire direction.

Further in the method of the present invention, the step of generating the tire classification database may include a step of determining, for the at least one to be classified tire, data indicating tire oscillations in radial tire direction.

In the method of the present invention, the step of generating the tire classification database may include a step of determining, for the at least one to be classified tire, tire force spectrum data.

In the method of the present invention, the step of generating the tire classification database may include a step of determining, for the at least one to be classified tire, tire force resonance center of gravity data.

In the method of the present invention, the step of generating the tire classification database may include a step of determining, for the at least one to be classified tire, tire force resonance width data.

In the method of the present invention, the step of determining tire force spectrum data may be based on the data indicating tire oscillations in tangential tire direction; and/or the step of determining tire force resonance center of gravity data may be based on the data indicating tire oscillations in tangential tire direction; and/or the step of determining tire force resonance width data may be based on the data indicating tire oscillations in tangential tire direction.

In the method of the present invention, the step of determining tire force spectrum data may be based on the data indicating tire oscillations in radial tire direction; and/or the step of determining tire force resonance center of gravity data may be based on the data indicating tire oscillations in radial tire direction; and the step of determining tire force resonance width data may be based on the data indicating tire oscillations in radial tire direction.

In the method of the present invention, the step of generating the tire classification database may include a step of determining, for the at least one to be classified tire, at least one of at least one parameter setting for indirect tire pressure monitoring and at least one operation mode for indirect tire pressure monitoring.

In the method of the present invention, in the case the step of determining whether the vehicle tire type can be associated to one of the at least one classified tire type fails, the step of tire pressure monitoring may be performed on the basis of at least one of a default parameter setting and a default operation mode.

In the system of the present invention, the tire classification database may indicate, in association to each of the at least one classified tire type, at least one of at least one parameter setting for tire pressure monitoring and at least one operation mode for tire pressure monitoring; wherein the system of the present invention may further comprise a retrieving unit being adapted to retrieve at least one of the at least one parameter setting and at least one operation mode from the tire classification database, wherein the tire pressure monitoring unit may be adapted to perform tire pressure monitoring according to the retrieved at least one parameter setting and operation mode.

In the system of the present invention, the vehicle tire type determination unit may be adapted to determine an overall vehicle tire type for the vehicle.

Here, the tire pressure monitoring unit may be adapted to perform tire pressure monitoring for at least two different tires of the vehicle according to the associated classified tire type.

In the system of the present invention, the vehicle tire type determination unit may be adapted to determine an individual vehicle tire type for at least two different tires of the vehicle.

In such embodiments, the association determination unit may be adapted to determine whether the vehicle tire type can be associated to one of the at least one classified tire type with respect to each of the at least two different tires.

Further, the tire pressure monitoring unit may be adapted to perform tire pressure monitoring for each of the at least two different tires according to the respectively associated classified tire type.

In the system of the present invention, the vehicle tire type determination unit may be adapted to determine at least one characteristic of a tire of the vehicle; and the association determination unit may be adapted to determine whether one of the at least one classified tire type has at least one characteristic being at least comparable with the determined at least one vehicle tire characteristic.

In the system of the present invention, the vehicle tire type determination unit may be adapted to perform wheel speed spectrum analysis to obtain a wheel speed spectrum data for the at least one tire.

Here, the association determination unit may be adapted to determine whether the tire classification database includes data indicating a tire type having tire force spectrum data being at least comparable with the wheel speed spectrum data.

According to the present invention, the association determination unit may be adapted to determine wheel speed resonance center of gravity data for the at least one tire.

Then, the vehicle tire type determination unit may be adapted to determine whether the tire classification database includes data indicating a tire type having a tire force resonance center of gravity data being at least comparable with the wheel speed resonance center of gravity data.

In the system of the present invention, the association determination unit may be adapted to determining wheel speed resonance width data for the at least one tire.

In such embodiments, the vehicle tire type determination unit may be adapted to determine whether the tire classification database includes data indicating a tire type having a tire force resonance width data being at least comparable with the wheel speed resonance width data.

The system of the present invention may further include means being adapted to carry out the steps set forth above with respect to generation of the tire classification database.

Further, in the system of the present invention, in the case the vehicle tire type can be associated to one of the at least one classified tire type fails, the tire pressure monitoring unit may be adapted to perform tire pressure monitoring on the basis of at least one of a default parameter setting and a default operation mode.

The computer program product of the present invention may further comprise program code for carrying out, when executed on a processing system, the steps of at least one of the above-mentioned possible embodiments of the method of the present invention.

The computer program product of the present invention may be stored on a computer-readable storage medium or in a computer-readable storage device.

Now, referring to the drawings again, FIG. 1 schematically illustrates a principle system arrangement according to the present invention, particularly in form an tire pressure deviation (TPD) warning system 2.

The TPD warning system 2 may for example be a hardware and/or software component, which is integrated in an electronic control unit (e.g. ECU) of a vehicle. The system 2 obtains so-called vehicle data by means of an interface unit 4, which may be—in the case of an at least partially software based implementation—an application program interface (API). The vehicle data may include vehicle signals from the vehicle CAN bus e.g. describing the vehicle condition. The vehicle data may (further) include measuring data, information, signals and the like directly obtained and/or indirectly derived from vehicle's sensors, such as rotational speed sensors (as existent in the vehicle's ABS), which indicate angular velocities of rotating wheels and tires, respectively.

In particular, the vehicle data may be indicative of ambient temperature, temperature of an engine of the vehicle, wheel/tire angular velocity, wheel/tire rotational speed, engine torque of an engine of the vehicle, torque acting on the at least one tire, engine speed of an engine of the vehicle, yaw rate of the vehicle, speed of the vehicle, lateral and/or longitudinal acceleration of the vehicle, steering wheel angle of a steering wheel of the vehicle, of a driving condition of the vehicle, particularly a braking condition, gear shift of the vehicle being in progress and an active control device of the vehicle being actively operating.

Any of such data may be used by units for determining tire pressure indicating data, which units are described below. However, in embodiments described here, particularly, wheel/tire angular velocity and/or wheel/tire rotational speed may be used for tire pressure determination and can be considered as an example for information indirectly indicating tire pressure.

To provide such vehicle data, an ECU and/or sensors of the vehicle may be used. For example, temperature sensor(s), yaw rate sensor(s), torque sensor(s), speed sensor(s), accelerator sensor(s), and/or sensors indicating accelerator pedal, clutch pedal and/or braking pedal position(s) my be employed to acquire vehicle data and/or to perform measurements on the basis of which vehicle data may be derived.

The vehicle data may directly provided to units of system 2 and/or may be stored in a memory unit 6 for later use.

A diagnosis control unit 8 performs internal system and input signal checks and sets system status and error codes, which may be considered as device status data and/or error indicating data. If a severe error occurs, this unit can disable the system 2.

Obtained vehicle data may be input to a preprocessing unit 10, which may process (e.g. filters) vehicle data, for example, to remove disturbances and offsets, and may pre-compute vehicle data such that they can be used by other system parts.

Signals output by preprocessing unit 10 are input to a unit for roll radius based indirect tire pressure monitoring, here exemplarily in form of a wheel radius analysis (WRA) unit 12, and/or a wheel spectrum analysis (WSA) unit 14. To WRA unit 12 and a WSA unit 14 will be provided vehicle data (unprocessed and/or processed by preprocessing unit 10) at least indicating wheel/tire angular velocity and/or wheel/tire rotational speed. Further vehicle signals may be related to wheel/tire angular velocity "energy", yaw rate, yaw rate from wheel/tire velocity, engine torque, braking in progress, reverse driving in progress, active control in progress, vehicle speed, longitudinal acceleration, lateral acceleration, wheel slip, normalized traction force, gear shift in progress, data quality indicators (dynamic driving, slip variance, etc.), ambient temperature and vehicle status.

In some embodiments, WRA unit 12 and WSA unit 14 may be further provided data indicating, e.g., special driving conditions (e.g. driving with snow chains, on rough roads, on oval track and in a roundabout etc.). Such data may be generated by a dynamic state detector unit 16 based on vehicle data from interface 4, memory 6 and/or preprocessing unit 10. Thus, data from dynamic state detector unit 16 may be also referred to as vehicle data as they are derived there from and can be considered as driving situation/scenario indicating data according to some embodiments of the present invention.

Wheel radius analysis as executed in the WRA unit 12 are based on the fact that the wheel speed of a wheel depends on the respective wheel radius: the wheel speed increases with decreasing wheel radius. Changes in the wheel radius contain information about changes in the tire pressure of the corresponding wheels, but may also reflect, e.g., vehicle load changes and surface changes or react on driving forces (acceleration, braking, forces in curves etc.).

WRA unit 12 may detect relative changes in tire pressure with respect to at least two tires.

Based on the wheel angular velocity signals, WSA unit 14 detects changes in the spectral properties of each of the four wheel angular velocity signals. The tire pressure has significant influence on the characteristics of the spectrum of the angular velocity signal; however, further conditions (e.g.

driving situation, road surface and temperature) may also have an impact on the angular velocity signal spectrum and may be therefore considered.

WSA unit 14 may detect changes in tire pressure for each wheel individually, for example by calculating a parametric model of the wheel/tire velocity spectrum and using the parameters of this model to calculate a spectral shape factor that condenses the different pressure dependent features of the spectrum into one single scalar quantity.

In further embodiments, WSA unit 14 may use DFT-based approach(es) or method(s) to determine wheel/tire spectrum.

According to embodiments described here, WSA unit 14 may be considered as implementation of the step of determining the vehicle tire type and/or the vehicle tire type determination unit or at least a part of such an implementation; in the latter case below described combination unit 18 may be considered as implementation of remaining parts.

In addition or as alternative, WSA unit 14 may be considered as implementation of the step of tire pressure monitoring and/or the tire pressure monitoring unit or at least a part of such an implementation; in the latter case below described combination unit 18 may be considered as implementation of remaining parts.

Tire pressure indicating data may provided by WRA unit 12 only or by WSA unit 14 only or by both WRA unit 12 and WSA unit 14.

A combination unit 18 obtains data from WRA unit 12 and/or WSA unit 14 and from interface unit 4, memory unit 6 and/or preprocessing unit 10. According to described embodiments, data generated by combination unit 18 may be considered as implementation of tire pressure condition data.

More specifically, data provided to combination unit 18 include tire pressure deviation data of at least one of WRA unit 12 and WSA unit 14. Such data will be used to determine tire pressure condition data indicative of tire pressure deviation condition(s) for the vehicle tire. To this end, combination unit 18 may also use data indicating, e.g., special driving conditions (e.g. driving with snow chains, on rough roads, on oval track and in a roundabout etc.) provided by dynamic state detector unit 16 and/or further vehicle data.

In general, combination unit 18 determines, based on input data, tire pressure deviation condition(s) for each tire separately or for at least two tires together. In embodiments not illustrated, combination unit 18 determines whether tire pressure indicating data indicate a deviation from a preset, desired and/or required tire pressure. To this end, combination unit 18 may additionally take into account further input data, such as data representing a current driving situation, since such data may influence a decision whether an inappropriate tire pressure deviation exists. Such determination(s) may use threshold comparison(s). Then, an inappropriate tire pressure deviation may be ascertained in the case tire pressure indicating data violate an upper and/or lower threshold (e.g. maximally and minimally, respectively, allowable tire pressure).

If an inappropriate tire pressure deviation condition is detected, combination unit 18 may generate warning data, enable a warning signal and the like to inform about the inappropriate tire pressure deviation condition.

According to embodiments described here, combination unit 18 may be considered as implementation of the step of determining the vehicle tire type and/or the vehicle tire type determination unit or at least a part of such an implementation; in the latter case WSA unit 14 may be considered as implementation of remaining parts.

In addition or as alternative, combination unit 18 may be considered as implementation of the step of determining whether a vehicle tire type can be associated to one of the at least one classified tire type and/or the association determination unit, or at least a part of such an implementation; in the latter case WSA unit 14 may be considered as implementation of remaining parts.

As set forth above, different tire types may exhibit different tire pressure related behaviors. For optimization, indirect tire pressure monitoring is, according to the present invention, adapted to take into account different tire types. In general, the present invention teaches to determine the type of a vehicle tire to be indirectly tire pressure monitored, to determine whether the determined vehicle tire type can be associated to a previously classified tire type and, in the case such an association can be made, to indirectly tire pressure monitor the vehicle tire in question according to the associated classified tire type.

In the following, embodiments for classification of tire types are explained with reference to FIG. 2.

Tire to be classified were mounted in a test rig for performing force spectrum analysis in order to obtain information on characteristic oscillations of a tested tire. A tire belt oscillates in the tangential direction due to force variations in the contact area with the ground (e.g. when it hits a small obstacle). This force can be measured in the longitudinal direction of the hub, when the tire is mounted in a rig (force equilibrium); see FIG. 2*a*. The tire also oscillates in a translational motion as a spring-damper system, when compressed by the cleat. This force can be measured in the vertical direction of the hub, see FIG. 2*b*.

Actual experiments have shown that the first eigenfrequency of the tangential mode and the first eigenfrequency of the translational mode are legible at different velocities. For example, in some experiments first eigenfrequency of the tangential mode is most legible at low velocities (30 km/h), while the first eigenfrequency of the translational mode is most legible at higher velocities (90 km/h).

In some embodiments, for estimation of power spectrum of the tire forces, force data is down sampled to 400 Hz and segmented so that each segment contains data from one drum revolution (or one cleat impact). The segments are zero padded to be of length 1024 samples and windowed to eliminate leakage from transients. The periodogram (power spectrum estimate) is calculated according to Welch's method:

$$\Phi(\omega) = \frac{1}{R}\sum_{k=1}^{R} \Phi_M^{(k)}(\omega)$$

where R is the number of segments of length M (here M=1024), and $$\Phi_M^{(k)}(\omega) = \frac{T}{M}|FFT(F_k(t))|^2$$

where Fk(t) is the k:th segment.

Changes in a power spectrum of tire forces may be characterized by the following terms:
Resonance Center of Gravity $f_{cog}$:

$$f_{cog} = \frac{\int_{f_{low}}^{f_{high}} f * P_{xx}(f) df}{\int_{f_{low}}^{f_{high}} P_{xx}(f) df},$$

where Pxx(f) is the power spectrum for a tire xx and $f_{low}$ and $f_{high}$ indicate lower and upper, respectively, frequencies defining a frequency band of interest.

Resonance width w:

$$w = \sqrt{\frac{\int_{f_{low}}^{f_{high}} (f - f_{cog})^2 * P_{xx}(f) df}{\int_{f_{low}}^{f_{high}} P_{xx}(f) df}}$$

The spectral features $f_{cog}$ and w were computed for each power spectrum estimate in order to generate feature trajectory plots. In some embodiments, the following frequency boundaries have been used:
For Tire Forces in Tangential Tire Direction:
$f_{low}$=20 Hz
$f_{high}$=50 Hz
For Tire Forces in Tangential Tire Direction:
$f_{low}$=60 Hz
$f_{high}$=120 Hz Analysis of trajectories of spectral features $f_{cog}$ and w for power spectrum estimates of tested tire(s) in view of results obtained from in-vehicle tests of the same tire(s) demonstrated that a tire force spectrum obtain from a tire in a test rig and, particularly, its spectral features $f_{cog}$ and w is correlated to a wheel speed spectrum of the same tire obtained in in-vehicle experiments and, respectively, to the spectral features $f_{cog}$ and w obtained for the wheel speed spectrum. Such a wheel speed spectrum may be provided by above WSA unit 14.

FIG. 3 shows graphs schematically illustrating wheel speed spectrum data (FIG. 3(a)) and tire force spectrum data (FIG. 3(b)). Each of the illustrated curves includes data obtained for different tire pressures. As can been seen, each of the tire types 368, 362 and 328 have at least comparable wheel speed spectrum data and tire force spectrum data and also have at least comparable pressure dependent behavior. Thus, having information like that illustrated in FIG. 3(b) allows to determine whether a vehicle tire to tire pressure monitored in actual use can be associated to a previously classified tire type (e.g. in the illustrated example, whether a vehicle tire to tire pressure monitored is tire type 368, 362 or 328).

As a result, tire force spectrum analysis of a tire in a test rig, e.g. performed as set forth above, provides information on the behavior of that tire when mounted on a vehicle under actual driving conditions.

Correlation of tire force spectrum obtained from test rig experiments (and its spectral features $f_{cog}$ and w) and wheel speed spectrum (and its spectral features $f_{cog}$ and w) may be, e.g., readily apparent due to comparable features trajectories (in scaled or un-scaled form), e.g. as demonstrated in FIG. 3, and/or obtained on the basis of neuronal network techniques.

On the basis of such correlation(s), it is possible to determine an association of a tire currently used on a vehicle and a tire classified by test rig experiments.

Further, test rig experiments and verification thereof based on in-vehicle tests have shown that tire force spectrum also indicates whether a tire will be easily indirectly tire pressure monitored or not. Even more, it is possible to discriminate in greater detail simplicity and/or complexity of tire pressure monitoring for different tire types, e.g., tires that may be tire pressure monitored with a low, an intermediate or a high degree of complexity.

Such information on a tire type may be used to pre-define parameter setting(s) and/or operation mode(s) to be used in tire pressure monitoring a tire of that type in actual use on a vehicle.

With respect to possible parameter settings it is noted that (for example, as known from e.g wheel/tire spectrum analysis) tires respond differently. For example, stiffer tires may react with reduced/increased amplitude for changed tire pressure and softer tires may react with a frequency shift. With a soft tire the response may be so large that the parameters need to be less sensitive to avoid false alarms. For some tires one or more modules of TPI may even be deactivated to improve robustness. Starting therefrom, it is therefore beneficial, when it comes to different parameter settings for different tires, to employ suitable tire response characteristics for tire to be monitored.

Information obtained in such experimental environment(s) may be provided in form of a database, which may be implemented in and/or associated to the above system 2 (e.g. memory unit 6, WSA unit 14, and/or combination unit 18).

In the following, embodiments of tire pressure monitoring using such a database are described, wherein reference is made to above system 2 for illustration purposes only. Further, it is noted that, since WSA unit 14 is capable of providing information indicating individual tire pressure, the following procedure may be preformed for a single vehicle tire, more than one vehicle tire and up to all vehicle tires.

In use, WSA unit 14 determines wheel speed spectrum data of each vehicle tire to monitored. The wheel speed spectrum data may be determined for, e.g., a specific vehicle speed, a vehicle speed range, a specific wheel speed, a wheel speed range etc.

Further, spectral features $f_{cog}$ and w of the determined wheel speed spectrum data may be determined.

On the basis of the wheel speed spectrum data and/or its spectral features $f_{cog}$ and w, it is ascertained whether the tire classification database comprising information on previously classified tire types includes tire force spectrum is data and/or respective spectral features $f_{cog}$ and w of a previously classified tire type to which the wheel speed spectrum data and/or its spectral features $f_{cog}$ and w may be associated.

In the case the database does not include such information (e.g. the vehicle tire to be monitored has not been previously classified, has not been included in the tire classification database etc.), system 2 is normally operated. Normal operation may be based on default parameter setting(s) and/or operation mode(s) for tire pressure monitoring; such default information may be implemented in system 2 itself or may be provided by the tire classification database.

In the latter case, the tire classification database may include information indicating a default classification tire. A default classification tire may be specified on the basis of, e.g., empirical, statistical, model based consideration. Default parameter setting(s) and/or operation mode(s) for a default classification tire may be defined to provide for an optimal to monitoring of a plurality of different tire types (e.g. tire types common on the market, tire types usually used with the vehicle, tire types recommended for the vehicle etc.).

In the case an association of vehicle tire(s) and a classified tire can be made (particularly, an association of the spectrum data and their spectral features $f_{cog}$ and w), system 2 retrieves from the tire classification database parameter setting(s) and/or operation mode(s) previously defined for tire pressure monitoring of the identified classified tire type. Retrieved parameter setting(s) and/or operation mode(s), which may be as set forth above, are then used by system 2 in actual tire pressure monitoring of vehicle tire(s).

If system 2 determines that the vehicle is equipped with tires of two or more different types, the forgoing procedure (e.g. determination whether a classified tire type can be associated, retrieval of parameter setting(s) and/or operation mode(s), tire pressure monitoring according to retrieved parameter setting(s) and/or operation mode(s)) may performed for each vehicle tire type separately (in parallel or subsequently).

In cases of two or more different vehicle tire types it is also possible to determine a so-called overall vehicle tire type, e.g. a virtual tire accommodating at least some properties of all actual tire types (particularly, their pressure dependent behavior). An overall vehicle tire type may be obtained by computing, on the basis of wheel spectrum data for different actual tire types, wheel spectrum data to be used for identifying a classified tire type to be associated to all actual tire types. Such computed wheel spectrum data may be derived by means of averaging, median and/or weighting techniques and/or the like.

What is claimed is:

1. A system for indirect tire pressure monitoring of tires of a vehicle, comprising:
   a tire classification database indicating at least one classified tire type being classified with respect to wheel speed spectrum data and/or tire force spectrum data;
   a vehicle tire type determination unit being adapted to determine a vehicle tire type for the vehicle on the basis of vehicle data in including information on at least one tire currently used with the vehicle, wherein the vehicle tire type determination unit is adapted to perform wheel speed spectrum and/or tire force spectrum analysis to obtain a wheel speed spectrum data and/or tire force spectrum data for the at least one tire;
   an association determination unit being adapted to determine whether the vehicle tire type can be associated to one of the at least one classified tire type, wherein the association determination unit is adapted to determine whether the tire classification database includes data indicating a tire type having wheel speed spectrum data and/or tire force spectrum data being at least comparable with the wheel speed spectrum data and/or tire force spectrum data; and
   a tire pressure monitoring unit being adapted to, in the case an association is determined, monitor tire pressure according to the associated classified tire type, wherein, in the case the association determination unit fails to associate the vehicle tire type to one of the at least one classified tire type, the tire pressure monitoring unit is adapted to perform tire pressure monitoring on the basis of at least one of a default parameter setting and a default operation mode.

2. The system of claim 1,
   wherein the tire classification database indicates, in association to each of the at least one classified tire type, at least one of at least one parameter setting for tire pressure monitoring and at least one operation mode for tire pressure monitoring; and
   further comprising a retrieving unit being adapted to retrieve at least one of the at least one parameter setting and at least one operation mode from the tire classification database, wherein the tire pressure monitoring unit is adapted to perform tire pressure monitoring according to the retrieved at least one parameter setting and operation mode; and/or
   wherein the vehicle tire type determination unit is adapted to determine an overall vehicle tire type for the vehicle, wherein the tire pressure monitoring unit is preferably adapted to perform tire pressure monitoring for at least two different tires of the vehicle according to the associated classified tire type; and/or
   wherein the vehicle tire type determination unit is adapted to determine an individual vehicle tire type for at least two different tires of the vehicle, wherein the association determination unit is preferably adapted to determine whether the vehicle tire type can be associated to one of the at least one classified tire type with respect to each of the at least two different tires, and/or
   wherein the tire pressure monitoring unit is adapted to perform tire pressure monitoring for each of the at least two different tires according to the respectively associated classified tire type; and/or
   wherein
      the vehicle tire type determination unit is adapted to determine at least one characteristic of a tire of the vehicle; and
      the association determination unit is adapted to determine whether one of the at least one classified tire type has at least one characteristic being at least comparable with the determined at least one vehicle tire characteristic; and/or
   further including means being adapted to carry out a method of indirect tire pressure monitoring of tires of a vehicle, comprising:
      providing a tire classification database indicating at least one classified tire type;
      determining a vehicle tire type for the vehicle on the basis of vehicle data in including information on at least one tire currently used with the vehicle;
      determining whether the vehicle tire type can be associated to one of the at least one classified tire type; and
      in the case an association is determined, monitoring tire pressure according to the associated classified tire type, wherein, determining whether the vehicle tire type can be associated to one of the at least one classified tire type fails, tire pressure monitoring is performed on the basis of at least one of a default parameter setting and a default operation mode.

3. The system of claim 1,
   wherein the association determination unit is adapted to determine wheel speed resonance center of gravity data for the at least one tire, wherein the vehicle tire type determination unit is preferably adapted to determine whether the tire classification database includes data indicating a tire type having a tire force resonance center of gravity data being at least comparable with the wheel speed resonance center of gravity data; and/or
   wherein the association determination unit is adapted to determining wheel speed resonance width data for the at least one tire, wherein the vehicle tire type determination unit is preferably adapted to determine whether the tire classification database includes data indicating a tire type having a tire force resonance width data being at least comparable with the wheel speed resonance width data.

4. The system of claim 3, further including a database generation unit being adapted to classification database on the basis of testing at least one to be classified tire in a test environment.

5. The system of claim 4,
   wherein the database generation unit being adapted to determine, for the at least one to be classified tire, data indicating characteristic tire oscillations; and/or
   wherein the database generation unit being adapted to determine for at least one to be classified tire, data indicating tire oscillations in tangential tire directions; and/or
   wherein the database generation unit being adapted to determine for at least one to be classified tire, data indicating tire oscillations in radial tire direction; and/or wherein the database generation unit being adapted to determine for at least one to be classified tire, tire force spectrum data; and/or wherein the database generation unit being adapted to determine for at least one to be classified tire, tire force resonance center of gravity data; and/or wherein the database generation unit being adapted to determine for at least one to be classified tire, tire force resonance width data; and/or wherein the vehicle tire type determination unit is adapted to determine tire force spectrum data based on the data indicating tire oscillations in tangential tire direction;

the vehicle tire type determination unit is adapted to determine tire force resonance center of gravity data based on the data indicating tire oscillations in tangential tire direction; and the vehicle tire type determination unit is adapted to determine tire force resonance width data based on the data indicating tire oscillations in tangential tire direction and/or wherein the vehicle tire type determination unit is adapted to determine tire force spectrum data based on the data indicating tire oscillations in radial tire direction;

the vehicle tire type determination unit is adapted to determine tire force resonance center of gravity data based on the data indicating tire oscillations in radial tire direction; and the vehicle tire type determination unit is adapted to determine tire force resonance width data based on the data indicating tire oscillations in radial tire direction; and/or wherein the database generation unit is adapted to determine for the at least one to be classified tire, at least one of at least one parameter setting for indirect tire pressure monitoring and at least one operation mode for indirect tire pressure monitoring.

6. A computer program product stored on a non-transitory computer readable memory for indirect tire pressure monitoring for detecting tire pressure deviation in tires of a vehicle, the computer program product comprising program code for carrying out, when executed on a processing system providing a tire classification database indicating at least one classified tire type being classified with respect to wheel speed spectrum data and/or tire force spectrum data;

determining a vehicle tire type for the vehicle on the basis of vehicle data in including information on at least one tire currently used with the vehicle, wherein determining the vehicle tire type includes wheel speed spectrum and/or tire force spectrum analysis to obtain a wheel speed spectrum data and/or tire force spectrum data for the at least one tire;

determining whether the vehicle tire type can be associated to one of the at least one classified tire type, wherein determining whether the vehicle tire type can be associated to one of the at least one classified tire type includes determining whether the tire classification database includes data indicating a tire type having wheel speed spectrum data and/or tire force spectrum data being at least comparable with the wheel speed spectrum data and/or tire force spectrum data; and in the case an association is determined, monitoring tire pressure according to the associated classified tire type, wherein, in the case the operation of determining whether the vehicle tire type can be associated to one of the at least one classified tire type fails, tire pressure monitoring is performed on the basis of at least one of a default parameter setting and a default operation mode.

7. The computer product of claim 6, further comprising program code for carrying out, when executed on a processing system:

wherein the tire classification database indicates, in association to each of the at least one classified tire type, at least one of at least one parameter setting for tire pressure monitoring and at least one operation mode for tire pressure monitoring; and retrieving at least one of the at least one parameter setting and at least one operation mode from the tire classification database, wherein tire pressure monitoring is performed according to the retrieved at least one parameter setting and operation mode; and/or determining the vehicle tire type includes determining on overall vehicle tire type for the vehicle, wherein tire pressure monitoring is preferably performed for at least two different tires of the vehicle according to the associated classified tire type; and/or determining the vehicle tire type is performed to determine an individual vehicle tire type for at least two different tires of the vehicle; and/or determining whether the vehicle tire type can be associated to one of the at least one classified tire type is performed with respect to each of the at least two different tires; and/or tire pressure monitoring is performed for each of the at least two different tires according to the respectively associated classified tire type; and/or determining the vehicle tire type includes determining at least one characteristic of a tire of the vehicle; and determining whether the vehicle tire type can be associated to one of the at least one classified tire type includes determining whether one of the at least one classified tire type has at least one characteristic being at least comparable with the determined at least one vehicle tire characteristic.

8. The computer product of claim 7, wheel spectrum analysis includes determining wheel speed resonance center of gravity data for the at least one tire, wherein determining whether the vehicle tire type can be associated to one of the at least one classified tire type preferably includes determining whether the tire classification database includes data indicating a tire type having a tire force resonance center of gravity data being at least comparable with the wheel speed resonance center of gravity data; and/or wheel spectrum analysis includes determining wheel speed resonance width data for the at least one tire, wherein determining whether the vehicle tire type can be associated to one of the at least one classified tire type preferably includes determining whether the tire classification database includes data indicating a tire type having a tire force resonance width data being at least comparable with the wheel speed resonance width data.

9. The computer product of claim 6, further comprising program code for carrying out, when executed on a processing system:

generating the tire classification database on the basis of testing at least one to be classified tire in a test environment.

10. The computer product of claim 9, further comprising program code for carrying out, when executed on a processing system:

generating the tire classification database includes determining, for the at least one to be classified tire, data indicating characteristic tire oscillations; and/or generating the tire classification database includes determining, for the at least one to be classified tire, data indicating tire oscillations in tangential tire direction; and/or generating the tire classification database includes determining, for the at least one to be classified tire, data indicating tire oscillations in radial tire direction; and/or generating the tire classification database includes determining, for the at least one to be classified tire, tire force spectrum data; and/or generating the tire classification database includes determining, for the at least one to be classified tire, tire force resonance center of gravity data; and/or, generating the tire classification database includes determining, for the at least one to be classified tire, tire force resonance width data; and or determining tire force spectrum data based on the data indicating tire oscillations in tangential tire direction; and/or determining tire force resonance center of gravity data is based on the data indicating tire oscillations in tangential tire direction; and/or determining tire force resonance width data is based on the data indicating tire oscillations in tangential tire direction; and/or wherein determining tire force spectrum data is based on the data indicating tire oscillations in radial tire direction; and/or determining tire force resonance center of gravity data is based on the data indicating tire oscillations in radial tire direction; and/or determining tire force resonance width data is based on the data indicating tire oscillations in radial tire direction; and/or generating the tire classification database includes determining, for the at least one to be classified tire, at least one of the least one parameter setting for indirect tire pressure monitoring and at least one operation mode for indirect tire pressure monitoring.

11. The computer product of claim 6, being stored on a computer-readable storage medium or in a computer-readable storage device.

* * * * *